Sept. 4, 1951  E. J. SVENSON  2,566,380
VARIABLE PRESSURE FLUID CONTROL CIRCUIT
Original Filed Aug. 2, 1940  8 Sheets-Sheet 1

INVENTOR.
Ernest J. Svenson
By:- Loftus, Moore, Olson & Trexler
attys.

Sept. 4, 1951 E. J. SVENSON 2,566,380
VARIABLE PRESSURE FLUID CONTROL CIRCUIT
Original Filed Aug. 2, 1940 8 Sheets-Sheet 5

INVENTOR.
BY: Ernest J. Svenson
Loftus, Moore, Olson & Trexler
attys.

Sept. 4, 1951 E. J. SVENSON 2,566,380
VARIABLE PRESSURE FLUID CONTROL CIRCUIT
Original Filed Aug. 2, 1940 8 Sheets-Sheet 6

INVENTOR.
Ernest J. Svenson
BY Loftus, Moore, Olson & Trexler
attys.

Sept. 4, 1951     E. J. SVENSON     2,566,380
VARIABLE PRESSURE FLUID CONTROL CIRCUIT
Original Filed Aug. 2, 1940     8 Sheets-Sheet 7

INVENTOR.
Ernest J. Svenson

Sept. 4, 1951 E. J. SVENSON 2,566,380
VARIABLE PRESSURE FLUID CONTROL CIRCUIT
Original Filed Aug. 2, 1940 8 Sheets-Sheet 8

INVENTOR.
Ernest J. Svenson
BY
Attys.

Patented Sept. 4, 1951

2,566,380

UNITED STATES PATENT OFFICE 2,566,380

VARIABLE PRESSURE FLUID CONTROL CIRCUIT

Ernest J. Svenson, Rockford, Ill., assignor, by mesne assignments, to Odin Corporation, Chicago, Ill., a corporation of Illinois Original application August 2, 1940, Serial No. 349,841, now Patent No. 2,358,361, dated September 19, 1944. Divided and this application September 13, 1944, Serial No. 553,941

20 Claims. (Cl. 60—52)

This invention relates to fluid control and actuator circuits, and particularly to such circuits adapted for machine actuation, such for example as the actuation of material working apparatus or the like.

It is an object of the invention to provide an improved fluid control and actuator circuit, particularly adapted for machine actuation, wherein the propelling pressures of the actuating or control fluid may be varied in predetermined sequence and at predetermined values.

More specifically stated it is an object of the invention to provide an improved fluid control and actuator circuit of the type defined, with associated control valve mechanisms, wherein the pressures of the control and actuating fluid are controlled by a plurality of pressure determining devices, which may be rendered effective successively and in predetermined sequence.

Further objects of the invention are to provide, in a fluid control circuit of the type defined, improved automatic means for rendering the respective pressure determining devices effective in a preselected sequence and for a preselected time interval; and improved means for individually controlling the effective pressures of the pressure determining devices, and for adjustably controlling their effective periods of operation and order of sequence.

Various other objects, advantages and features of the invention will be apparent from the following specification when taken in connection with the accompanying drawings wherein certain preferred structural embodiments are set forth for purposes of illustration.

In the drawings, wherein like reference numerals refer to like parts throughout.

In the drawings the fluid control and actuator circuit of the invention has been shown for illustrative purposes as applied to a hone expander unit of a honing machine. It is to be understood, however, that the circuit of the invention is adapted for use in effecting the actuation and control of various types of machines, including other material working machines or apparatus.

This application is a division of my copending application, Serial No. 349,841, filed August 2, 1940, and entitled "Material Working Apparatus," now issued as Patent No. 2,358,361, dated September 19, 1944. The claims of the present application are directed to the fluid control and actuating circuit.

Figures 1, 2, 23:
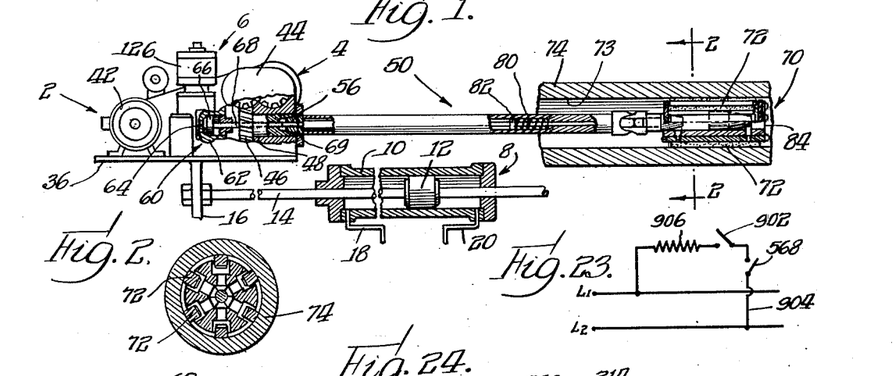
Figure 1 is a general assembly view of a portion of a material working apparatus, specifically a honing machine, to which the fluid control and actuating circuit of the invention has been shown applied for illustrative purposes.
Figure 2 is a view in vertical section of the honing tools taken along the line 2—2 of Figure 1.
Figure 23 is a schematic electrical wiring diagram.

Referring more specifically to the drawings, and first to Figures 1 and 2, the honing machine partially illustrated comprises a head stock 2 carrying a tool receiving and rotating drive mechanism 4 and a hone expander unit or mechanism 6; and a fluid actuator or motor 8 for imparting reciprocatory feeding and traversing movements to the head stock or carriage 2. The actuator 8 comprises a cylinder 10 and shiftable piston 12, the rod 14 of which is connected to a depending frame portion 16 of the head stock structure. Actuating fluid for shifting the piston 12, whereby to effect the feeding and traversing movements of the head stock, is supplied to the actuator cylinder 10 by means of a pair of pipes or fluid conduits 18 and 20 connected to suitable control valves and to a suitable fluid pressure source, such for example as pumping means or the like. Such means comprise no part of the invention claimed herein and hence are not illustrated in detail. Reference may be made, if desired, to said parent application, Serial No. 349,841, now issued as Patent No. 2,358,361, wherein such means are shown.

The head stock 2 comprises a base or support 36 mounted in any convenient manner for rectilinear movement or reciprocation along suitable ways or guides (not shown). The tool receiving and rotating mechanism 4 comprises an electric motor 42 which, through a belt (not shown), drives a change speed gear mechanism 44. The gear mechanism drives a worm wheel 46 fastened to a spindle 48. The spindle drives or rotates the honing tool, generally indicated by the numeral 50. A detachable coupling between the tool and spindle may be effected by providing the outer end of the spindle with a tapered aperture arranged to receive a tapered end fitting 56 forming a part of the tool structure.

The hone expander unit or mechanism 6 (presently to be described in detail) includes a fluid pressure hone expander actuator 60 comprising a cylinder 62 having a combined inlet and outlet port 64, a piston 66, and a piston rod 68. The rod 68 extends from the cylinder 62 through a central opening in the worm wheel 46 and through a central opening in the spindle 48 for abutting engagement with a rod member 69 forming a part of the honing tool structure.

The honing tool comprises a honing head 70 having a plurality of abrasive honing sticks 72 adapted for engagement with the wall 73 of the work piece 74 to be machined or honed, the work piece comprising a cylinder structure in the particular embodiment illustrated. The details of the honing tool are not material to the invention herein claimed, and are set forth in the aforementioned parent copending application, now issued as Patent No. 2,358,361, to which reference may be made if desired; suffice to say that the arrangement is such that when the tool expanding rod 69 is engaged by the piston rod 68, and shifted to the right against the force of a compression spring 80 which abuts a collar 82 formed on the rod 69, and against the action of springs 84 associated with the honing sticks, the honing sticks 72 are engaged against the surface of the work piece, at a pressure determined by that exerted by the piston rod. As will be understood, the springs 80 and 84 retract the sticks and the rod 69 as pressure within the hydraulic actuator 60 is relieved. It will thus be seen that the honing sticks will be urged into engagement with the work piece at a pressure determined by the actuating pressure of the piston rod 68, while the honing tool is being rotated by the spindle 48 and the head stock 2 is being bodily translated or reciprocated by the hydraulic actuator 8.

The force exerted on the piston rod 68 is dependent upon the pressure of the operating fluid existing within the actuator 60 formed as a part of the fluid control and actuator circuit for the hone expander unit. As will presently be described, in accordance with the invention the fluid control actuator circuit provides for the maintenance, in selected and predetermined automatic sequence, of several different pressures within the actuator 60, each pressure being of preselected magnitude and existing for a preselected time period, as may be desired. As previously stated, the above set forth hone expander structure is but one illustrative use for the fluid control and actuating circuit of the invention, which is of general application for machine actuation. Thus the piston rod 68, and the variable pressure control to be described, may be employed to actuate various types of actuated devices and mechanisms.

Figures 3, 4:
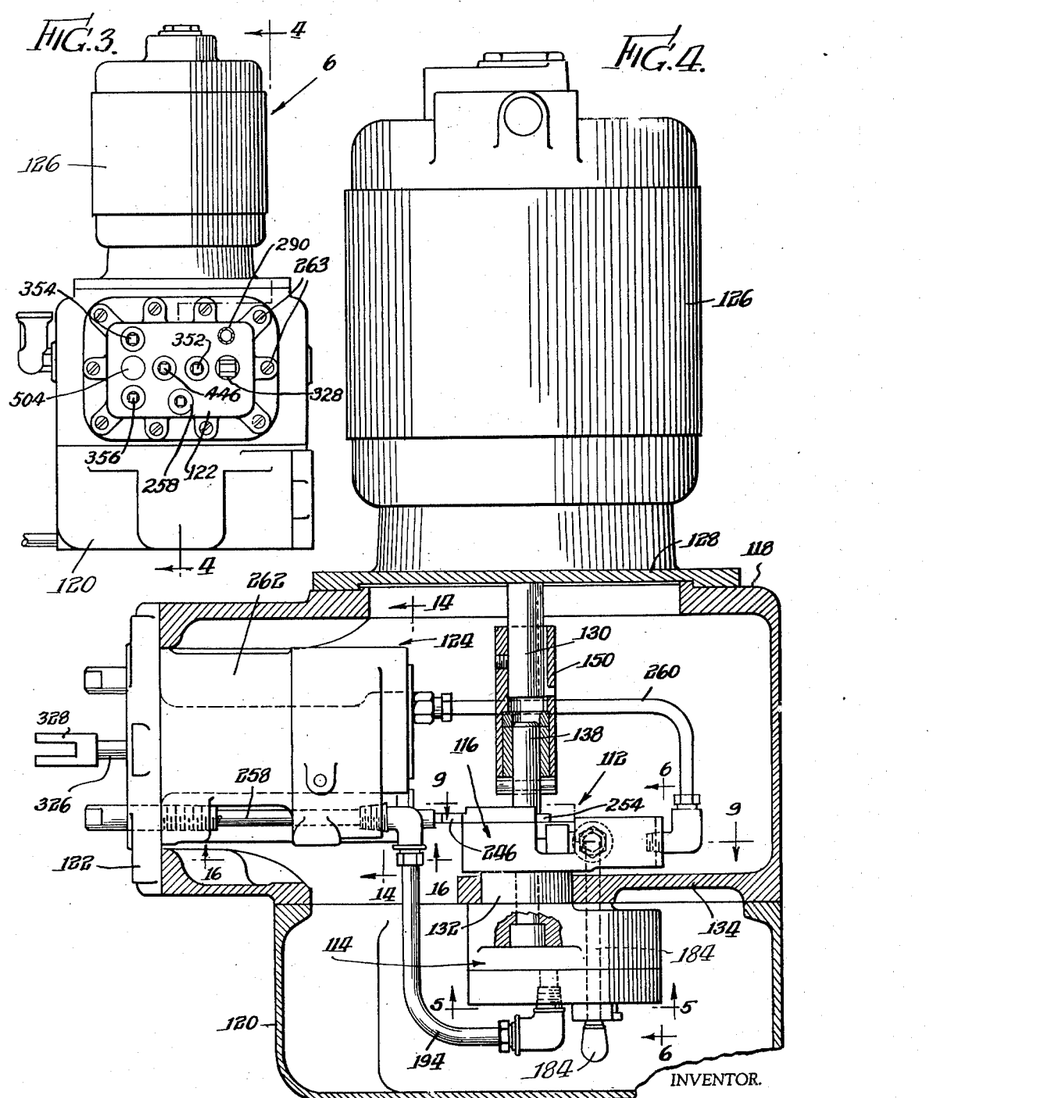
Figure 3 is a view, in elevation, on an enlarged scale, of the hone expander control unit or mechanism forming a part of the honing machine structure of Figure 1, and to the actuation and control of which the control circuit of the present invention is applied.
Figure 4 is a vertical sectional view of the expander control unit, on a further enlarged scale, and taken as indicated by the line 4—4 of Figure 3.
Figures 5, 6:
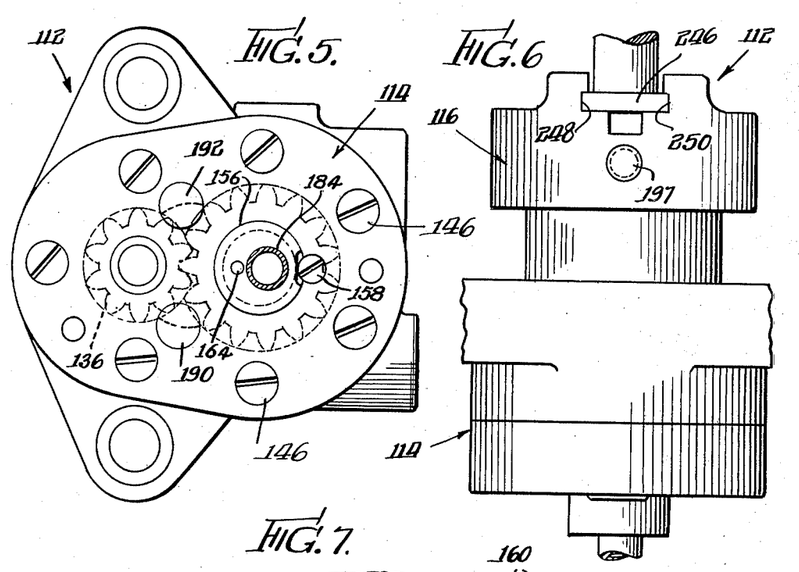
Figure 5 is an enlarged view in horizontal section taken along the line 5—5 of Figure 4 illustrating the gear pump of the expander control unit.
Figure 6 is an enlarged view in vertical section taken substantially along the line 6—6 of Figure 4.

Referring to the specific embodiment illustrated, the hone expander unit, and associated fluid control and actuating circuit, is illustrated in Figs. 3 to 24 inclusive. It comprises a source of fluid under pressure comprising a unitary pumping device 112, Figs. 4 to 10 inclusive, formed within and as a part of the expander unit structure. This pumping device consists of a gear pump 114 and a plunger or piston pump 116. The pumping device 112 is mounted in a casing or housing 118 having an open bottom enclosed by a bowl or tank 120 forming a fluid reservoir. The housing 118 is also open along one side and this opening in the side of the housing is closed by the mounting plate or housing flange 122 of a pressure determining and timing device 124 enclosed within the housing 118. The pressure determining and timing device controls the operation of the expander unit, as will presently be described. The housing 118 is surmounted by an electric motor 126 which may, if desired, be supported on the top or cover plate 128. The motor shaft 130 projects into the housing, as shown in Figure 4. The casing 132 of the unitary pumping device 112 may be secured in any convenient manner to the inwardly extending flange or shelf 134 of the housing 118, so that the plunger or piston pump 116 lies above the shelf, and the gear pump 114 lies below the shelf and in the fluid within the tank 120. If desired, the entire housing 118 may be used as a fluid reservoir.

The gear pump 114, which is basically similar to, but an improvement upon, the gear pump shown in my prior Patent 1,912,738, comprises a gear 136 (Figs. 5, 7, 8 and 10), the teeth of which are formed integral with or cut in a shaft 138. The shaft 138 is journaled in a bushing 140 (Fig. 10) mounted in a bore of the casing 132 and in a bushing 142 mounted in a cover plate 144 secured to the casing 132 as by screws 146 and pins 148. The shaft 138 is driven by the electric motor 126 through a suitable coupling 150 (Fig. 4).

The pump gear 136 meshes with a like pump gear 152 secured to a sleeve 153 journaled on a shaft or stud 154. The shaft 154 is received in an opening formed in the casing 132 and the cover plate 144 and is provided with an enlarged part 156 extending over the cover plate 144 and fastened thereto as by the head of the screw or bolt 158.

The pumping gear 152 and sleeve 153 are provided with angularly spaced radial openings 160 extending between the teeth of the gear from the base of the teeth to the inner bore of the sleeve. The shaft or stud 154 is provided with a longitudinal, off-center bore or passage 162 closed at its outer end by a plug 164, the passage 162 being in communication with a radial passage 166 positioned in the plane of the radial openings 160 of the gear 152 and sleeve 153. The opening 166 is positioned on a straight line between the centers of the gears 136 and 152, and therefore, as the mating teeth of the gears move from the positions shown in Fig. 7 to the positions shown in Fig. 8 fluid communication with the radial shaft opening 166 is transferred from one radial groove 160 to the next so that fluid trapped between the intermeshing gear teeth is substantially continuously discharged through the opening 166. The shaft or stud 154 is further drilled longitudinally from one end to the other to provide an eccentric bore 168. The upper end of the bore 168 is closed by a plug 170 and the lower end portion or chamber 172 of this bore is in fluid communication with the passage 162 by an inclined lateral passage 174. A plunger 176 of a pressure relief valve 177 is slidably mounted in the lower, reduced portion of the bore 168 and is normally urged by the spring 178 against a stop pin 180, which projects into the bore in position to hold the plunger above the upper edge of the lateral passage 174. The spring 178 is interposed between the plunger 176 and the plug 170 within the enlarged portion of the eccentric bore 168 and urges the plunger against the stop pin 180.

Figures 9, 10, 11, 12, 13:
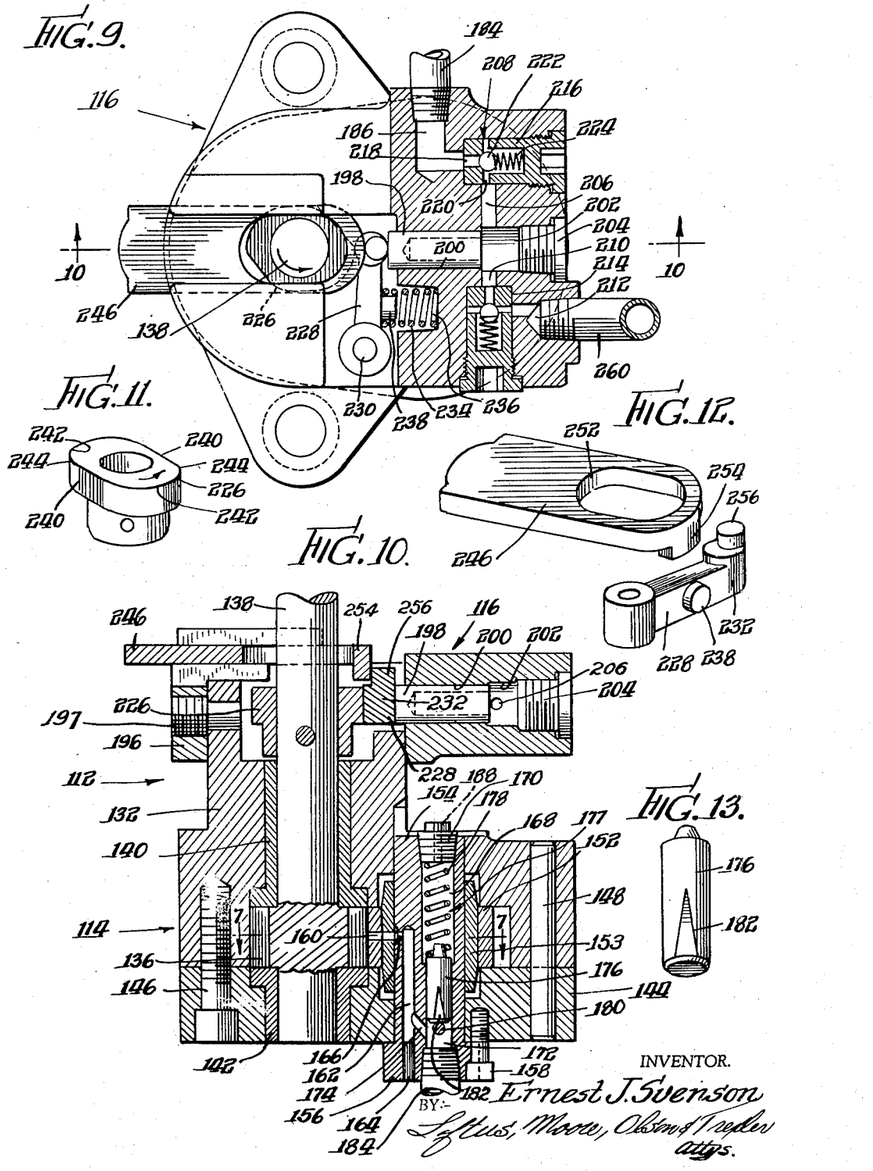
Figure 9 is an enlarged view in horizontal section taken substantially along the line 9—9 of Figure 4 illustrating the plunger pump of the expander control unit.
Figure 10 is a view in vertical section taken substantially along the line 10—10 of Figure 9.
Figures 11, 12, and 13 are views in perspective of parts of the mechanism shown in Figures 9 and 10.

The plunger 176 is provided with a tapered, surface groove 182 extending longitudinally of the plunger for a portion of its length, as best shown in Figure 13. A conduit 184 is threaded into the chamber 172 of the bore 168, and connects this chamber to an inlet port 186, Fig. 9, of the plunger or piston pump 116, for a purpose later to be described. An opening or passage 188 through the plug 170 establishes fluid communication between the upper enlarged portion of the eccentric bore 168 and the fluid within the reservoir or tank 120. Thus the plunger 176 and its associated spring 178 constitute a relief valve for limiting the pressure in the chamber 172.

Fluid is supplied to the gear pump 114 through an inlet port 190 (Fig. 5) which is in open communication with the fluid in the reservoir 120 and is expelled through the port 192 which is connected by the conduit 194 to the pressure determining and timing device 124.

Figures 7, 8:
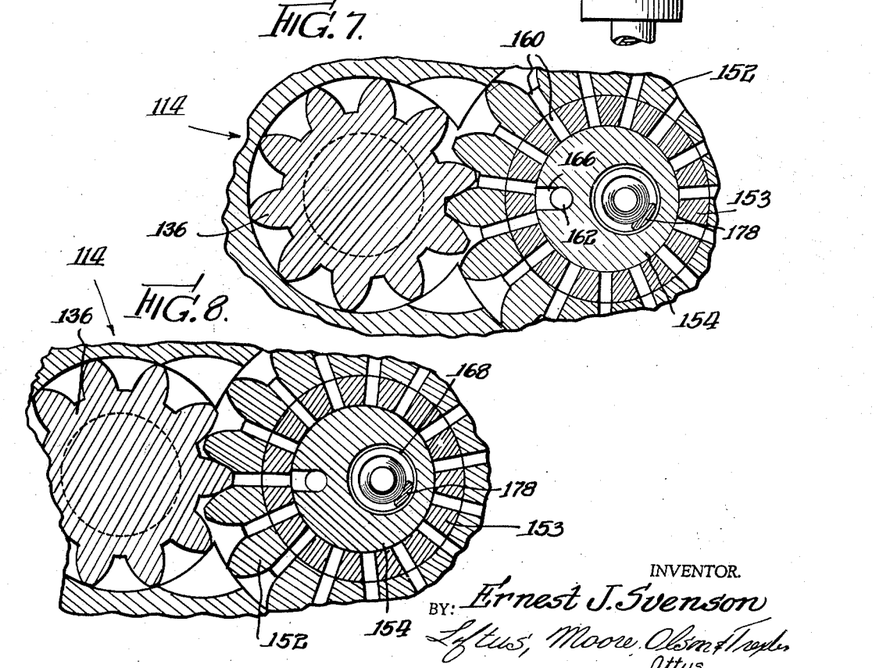
Figure 7 is a fragmentary enlarged view in horizontal section taken along the line 7—7 of Figure 10, also illustrating the expander control unit gear pump.
Figure 8 is a view similar to Figure 7 but with the parts in a different position of operation.

As the shaft 138 is rotated, the gears 136 and 152 run together as a gear pump drawing fluid into the port 190 from the reservoir and expelling it through the port 192. In Figure 7 a tooth of the gear 136 is shown just entering the space between an adjacent pair of teeth of the gear 152. As this engagement of teeth continues, a small quantity of fluid is trapped and a passage 160 is brought into registry with the radial opening 166 in the shaft or stud 154. Thus, the trapped fluid is expelled through the openings or passages 166, 162 and 174 into the chamber 172 from which it is discharged to the plunger or piston pump 116 through the conduit 184. This escape for trapped fluid prevents the creation of heavy stresses between the gears and also serves as a source of charging fluid for the plunger or piston pump, as will later appear.

The plunger or piston pump 116 comprises a pump casing 196 secured to the upper end of the casing 132 in any convenient manner as by the screws 197, (Fig. 10). A plunger or piston 198 is free to reciprocate in the bore 200 of the casing 196. An enlarged portion of the bore 200 forms a pumping chamber 202 closed by the cylinder head or screw plug 204. An inlet port or passage 206, Fig. 9, to the pumping chamber 202 communicates with the inlet port 186 of the plunger pump through a ball check valve 208; and the outlet port or passage 210 of the pumping chamber communicates with the outlet port 212 of the plunger pump through a ball check valve 214. Each of these ball check valves comprises a housing 216 inserted in a suitable opening in the pump casing 196 and secured thereto in any suitable manner, as by threading into receiving openings in the pump casing. Each housing is provided with axial and radial passages 218 and 220 communicating with the connecting passages in the pump casing. A ball valve 222 is urged by a spring 224 into position upon a valve seat formed at the intersection of the passages 218 and 220. The valve 208 permits substantially free flow of fluid from the pump inlet port 186 to the passage 206, but prevents flow in an opposite direction. The valve 214 permits a flow of fluid from the passage 210 to the pump outlet port 212, but prevents flow in a direction from the port 212 to the passage 210.

Since the chamber 172 of the gear pump is connected by the conduit 184 to the plunger pump inlet port 186, the pressure of the fluid in the chamber 172 is exerted through the check valve 208 against the inner end of the plunger or piston 198 and thus tends to force that plunger outward or to the left, as seen in Fig. 9. When the plunger is driven inward or to the right, the check valve 208 closes and fluid at a higher pressure is expelled through the check valve 214 and the plunger pump outlet port 212. The spring of the ball check valve 214 is considerably stiffer than the spring of the ball check valve 208 so that fluid entering the pump chamber through the check valve 208 will not pass out from the pumping chamber through the check valve 214 without the compressive action of the plunger 198.

The plunger 198 is actuated by a cam 226 pinned to the shaft 138, the cam causing oscillation of a plunger operating finger or lever 228 about its pivot pin 230. The finger or lever 228 has an enlarged rounded, outer end 232 as best seen in Figure 12 which is adapted to engage and operate the plunger 198. A coil spring 234 mounted in a pocket 236 of the casing 196 embraces the lateral lug 238 formed on the finger or lever 228 and urges the latter in a counterclockwise direction as seen in Figure 9 so that the rounded end portion 232 is maintained in engagement with the cam 226.

The cam 226 is of the two-lobed type, and as best seen in Figure 11 is formed to provide two opposing flat cam surfaces 240 joined by opposing rounded cam surfaces 242. Each of the cam surfaces 242 is made up of a rising surface portion extending from a lobe 244 through an angular distance of substantially ninety degrees in a direction opposite to the angular direction of rotation of the cam, and a portion of constant radius which extends to a point of tangency with the succeeding flat surface. Thus as a lobe 244 of the cam approaches the finger 228 during a revolution of the cam, inward motion is transmitted through the head 232 to the plunger 198 and the fluid under a desired pressure is expelled by way of the passage 210 and the check valve 214 to the pump outlet port 212. As a lobe 244 recedes from the finger, fluid, entering the chamber 202 through the check valve 208 and the passage 206, causes the plunger 198 to move to the left and the head 232 to follow and be maintained in engagement with the surface of the cam 226 unless the outward movement of the finger is limited, as will presently be described.

Thus, continued rotation of the cam 226 produces a reciprocating motion of the plunger or piston 198 and a consequent continuous delivery of fluid to the plunger pump outlet port 212. The purpose of the finger or lever 228 is to prevent transmission of side thrust to the plunger 198 from the cam 226.

As will later appear, it is necessary or desirable that the rate of delivery, that is, the volume of fluid delivered per minute by the plunger pump 116 be adjustable at will. For this purpose, the plunger pump is provided with an adjusting means, member or slide bar 246 slidable in the grooves 248 and 250, Fig. 6, formed in the top of the casing 196. The slide bar 246 is formed with an elongated opening 252, Fig. 12, which receives the shaft 138 and therefore permits the slide bar to straddle the shaft. At its forward end the bar is provided with a depending lug 254 having a forward rounded surface for engaging a pin 256 upstanding from the outer rounded end 232 of the finger 228. Adjustment of the slide bar to the right as seen in Figures 4, 9 and 10, may be effected by an adjusting screw 258 (Fig. 4) adjustably mounted in the housing of the pressure determining and timing device 124. The adjusting screw 258 at its inner end abuts the slide bar 246. Thus, when the slide bar is adjusted inward or to the right for less than the maximum pump delivery, the lug 254 will be engaged by the pin 256 as the plunger 198 and finger 228 move outward or to the left, and hence the finger 228 will not be permitted to move outward to the furthermost position permitted by the contour of the cam. Hence the stroke of the plunger or piston 198 will be shortened by adjusting the slide bar 246 inward or to the right, and the speed of the shaft 138 being maintained constant, the rate of delivery, that is, the volume of fluid delivered by the plunger pump per minute, will be decreased. Similarly, adjustment of the slide bar to the left permits an increase in the plunger or piston stroke and hence effects an increase in the rate of delivery of the fluid. It will be evident that as the adjusting screw 258 moves to the left as seen in Figure 4, the slide bar 246 will be released for outward movement upon the next outward movement of the plunger 198 and the slide bar thus moved to its new position of adjustment determined by the screw 258. If desired, the screw 258 may be suitably secured at its inner end to the outer end of the slide bar so that the latter will be positively moved outward or to the left upon adjustment of the screw.

It should be here noted that one lobe 244 of the cam 226 may be of greater radial distance from the center of the cam, so that for very low rates of delivery the slide 246 may be adjusted to position the lug 254 relative to the cam center at a distance exceeding the radial length of one lobe but less than the radial length of the other lobe. Hence, only one lobe will then be effective to actuate the pump plunger and the rate of delivery thus reduced.

The plunger pump outlet port 212 is connected by the conduit 260 (Figs. 4 and 9) to an inlet chamber or passage of the pressure determining and timing device 124.

As shown in Figs. 3, 4, 14–20, 22, and 24, the pressure determining and timing device 124 comprises a housing 262 mounted in the housing 118 by means of the integral outwardly extending peripheral flange or mounting plate 122 and suitable mounting bolts 263 (Fig. 3). Within the housing 262 there are mounted, as best shown in the schematic diagram of Figure 22, a main control valve 264, a plurality of pressure control or relief valves 266, 268 and 270, and a plurality of timing valves 272 and 274. In the particular embodiment set forth, the valve 266 may be set for high pressure relief, the valve 270 for an intermediate pressure relief, and the valve 268 for low pressure relief.

Figure 24:
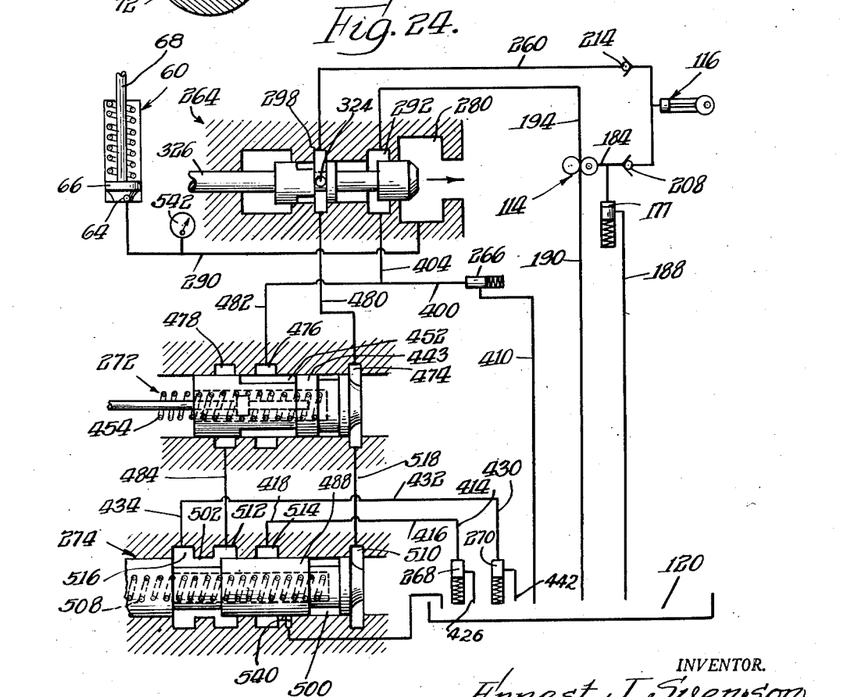
Figure 24 is a schematic fluid circuit diagram of the hone expander unit fluid control and actuating circuit.

The main control valve 264 comprises a valve body or plunger mounted in a bore 278 of the housing 262. The valve bore 278 is formed to provide an enlarged chamber 280 (Figs. 14, 15, 17, 22 and 24) which communicates with a bore 282 through which the fluid may be discharged into the reservoir or tank 120. The chamber 280 is also connected by a lateral passage 284 (Figs. 14 and 15) to a longitudinal passage 286 which is closed at one end as by a plug 288 and receives in its other end the conduit 290 which, as diagrammatically indicated in Figure 24, is connected to the port 64 of the fluid pressure hone expander actuator 60.

Figure 14:
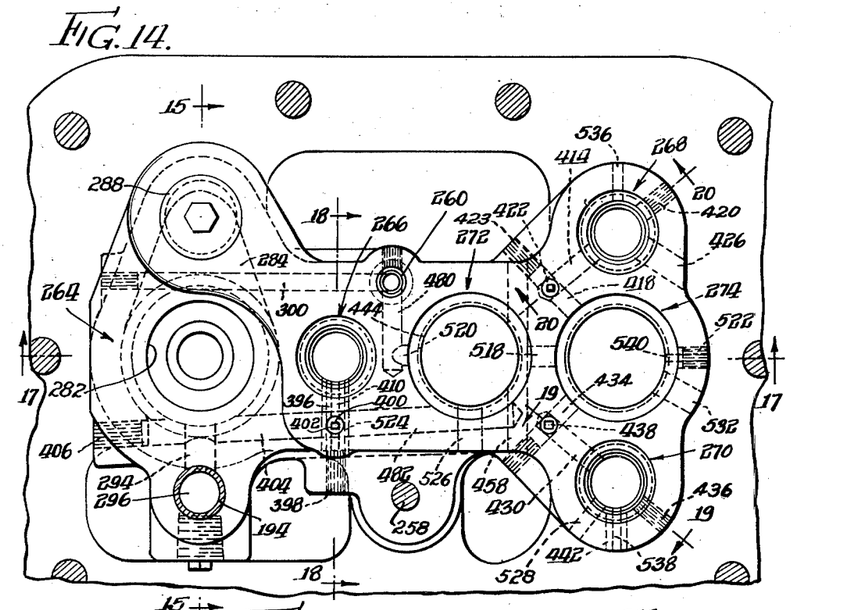
Figure 14 is an enlarged fragmentary view in elevation and partly in section, taken along the line 14—14 of Figure 4 and illustrating the pressure determining and timing device of the expander control unit and of the control and actuating fluid circuit thereof.
Figure 15:
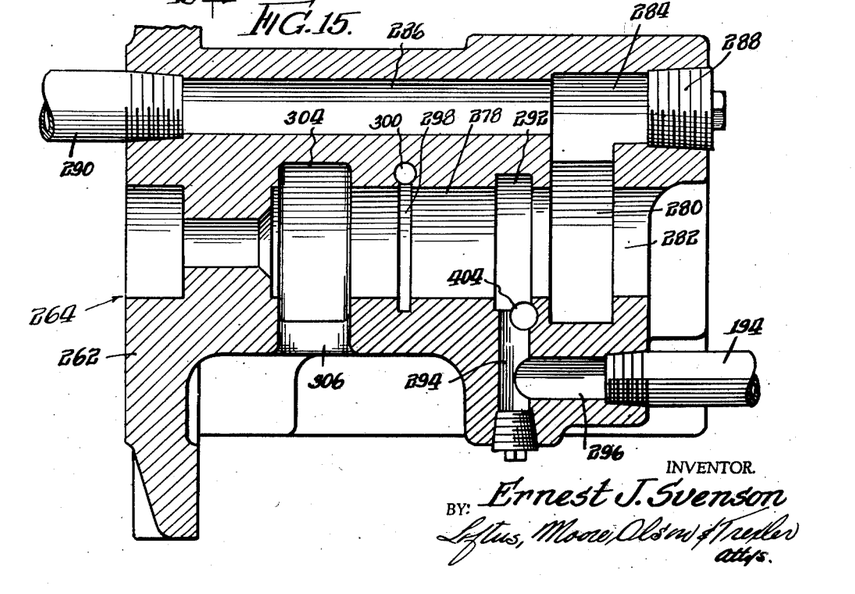
Figure 15 is a fragmentary view in vertical section taken along the line 15—15 of Figure 14.
Figure 16:
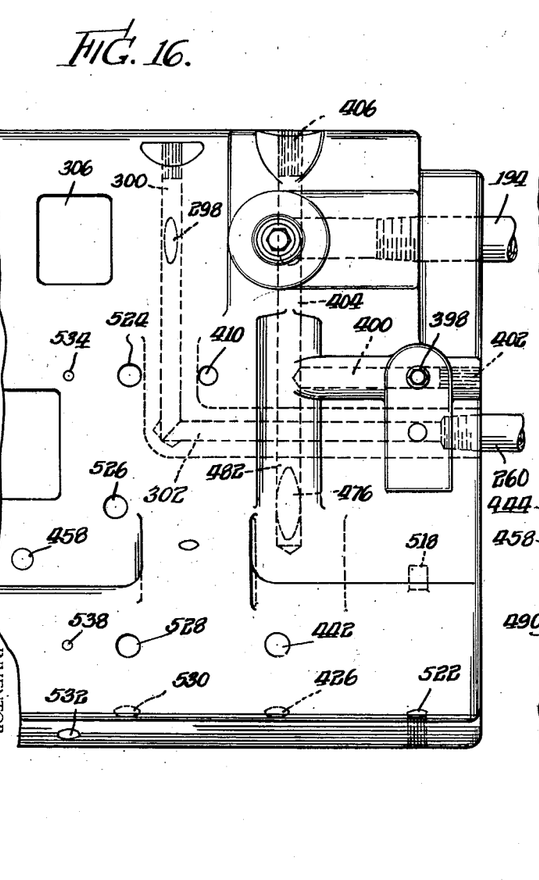
Figure 16 is an enlarged view in plan and partly in section taken along the line 16—16 of Figure 4.

An enlarged chamber 292 of the valve bore 278 is connected by a lateral passage 294, Fig. 15, to a longitudinal passage 296 to which the conduit 194 from the gear pump is connected. A chamber 298 of the valve bore 278 is connected by a passage 300, Figs. 14, 15 and 22, to the port 302 to which the conduit 260 from the plunger pump 116 is connected (see also Figs. 16 and 17). The enlarged chamber 304 of the valve bore 278 forms a drain from which the fluid flows through an opening 306 back into the reservoir or tank 120.

The valve 276 has a frustoconical end portion 308 (Fig. 22) adapted to engage a valve seat formed by the shoulder 310 of the housing 262 and to control the connection of the chamber 280 to the reservoir through the port 282. The cylindrical portion 312 of the valve snugly fits the wall of the bore between the chambers 280 and 292 and serves as a valve controlling communication between the chambers. A cylindrical portion 314 of the valve snugly fits the bore 278 and prevents fluid communication between the chamber 298 and the chamber 292. A cylindrical portion 316 snugly fits the bore 278 and provides a shoulder 318 formed by the reduced portion 320 of the valve. The portions 316, 318, and 320 form a valve controlling fluid communication between the passage 298 and the bore 278.

The valve plunger is also formed with an axial passage 322 communicating with a radial passage 324 to the left of the valve portion 314. These passages 322 and 324 establish fluid communication between the chamber 298 and the chamber 280 when the valve is in the position shown in Figure 22. The valve body 276 is coupled in any convenient manner to a sliding valve stem or operating rod 326 provided at its outer end with a bifurcated coupling 328 (Figs. 4 and 22), which through a suitable linkage may be connected to a manual actuator (not shown) or to the core of an actuating solenoid 906, Fig. 23, (later to be described). Fluid leakage along and around the stem 326 may be prevented by a suitable seal 330.

Figure 22:
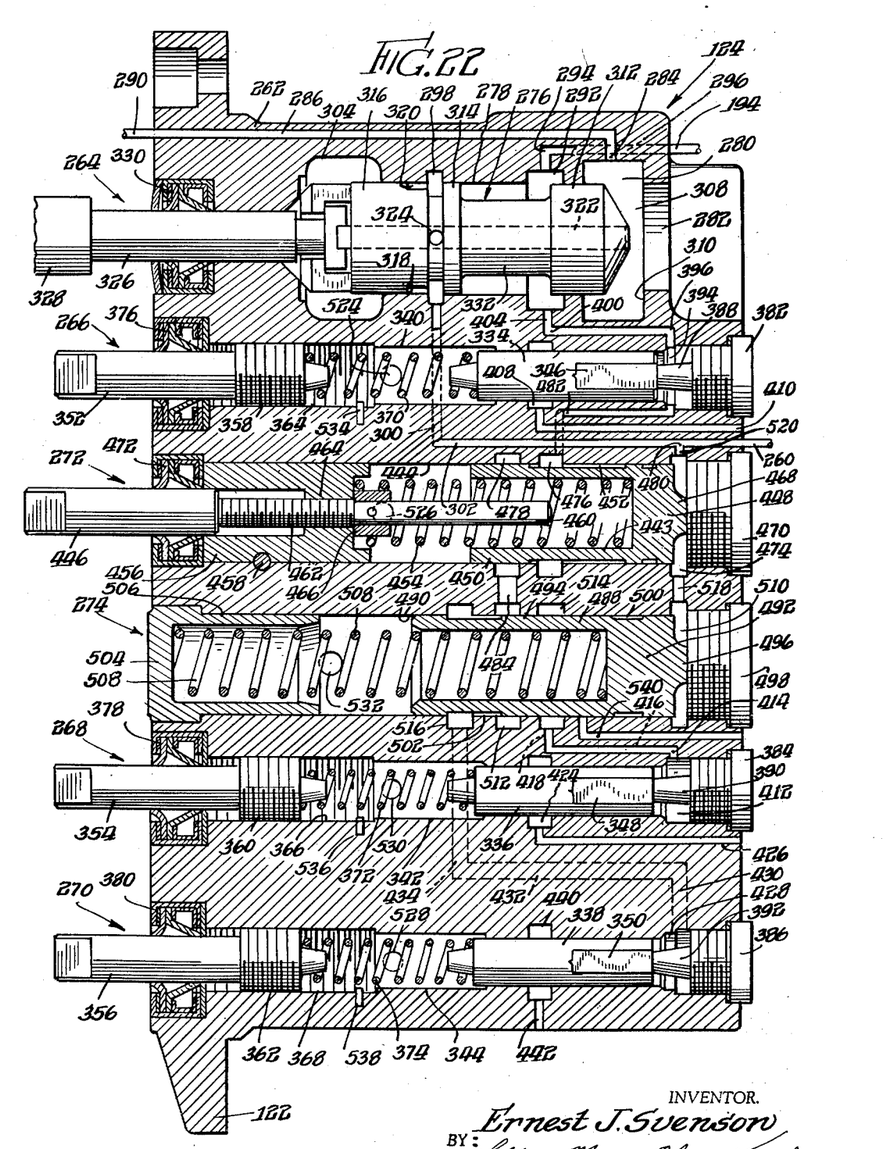
Figure 22 is a schematic or rolled-out diagram of the time and pressure control valve mechanism of Figures 14 to 21.

If the valve body 276 is in the position shown in Figure 22, which is its neutral or inactive position, fluid delivered by the plunger pump 116, which may be termed a metering pump, is delivered through the conduit 260 and passage 300 to the chamber 298 from which it passes into the bore 278 and from the bore through the radial passage 324 and the axial passage 322 into the chamber 280. The chamber 280 being open to the reservoir through the bore 282 the metering pump 116 simply pumps fluid back into the reservoir.

The chamber 292 is cut off from fluid communication with the chamber 280 by the valve portion 312 and is connected through passages (to be described) to the reservoir. These passages are controlled by the valve 266. Hence, when the valve body 276 is in the position shown in Figure 22, the gear pump, which may be termed a feed pump, delivers fluid through the conduit 194, the passages 296 and 294, the chamber 292 and back to the reservoir from this chamber at a pressure determined by the setting of the valve 266.

To initiate a working cycle, the actuator for the valve stem 326 must be moved to shift the valve stem and the associated valve body 276 to the right of the position shown in Figure 22. When the valve body 276 is in this active position the port 282 is closed by the valve portion 312, and hence the chamber 280 is sealed from the reservoir. The chamber 280 is now connected to the chamber 292 by the reduced portion 332 of the valve body. Also, since the shoulder 318 will have passed to the right of the chamber 298 the portion 316 of the valve body cuts off fluid communication between this chamber and the valve chamber 278, and the chamber 298 is sealed from the radial passage 324. Therefore, with the valve body 276 in its extreme position to the right (with reference to Fig. 22), the fluid delivered by the feed pump 114 will be directed from the chamber 292 to the chamber 280, and then through the passages 284 and 286 to the conduit 290, through which the fluid is conveyed, as schematically indicated in Figure 24, to the port 64 of the fluid pressure hone expander actuator 60.

Fluid delivered by the metering pump 116 is now prevented from being discharged directly to the reservoir because of the sealing of the radial passage 324 from the chamber 298. As will later appear, the fluid delivered to the chamber 298 by the metering pump 116 is employed to actuate the pressure control and timing valves 266, 268, 270, 272 and 274, and under the control of these valves is returned to the reservoir.

Figure 18:
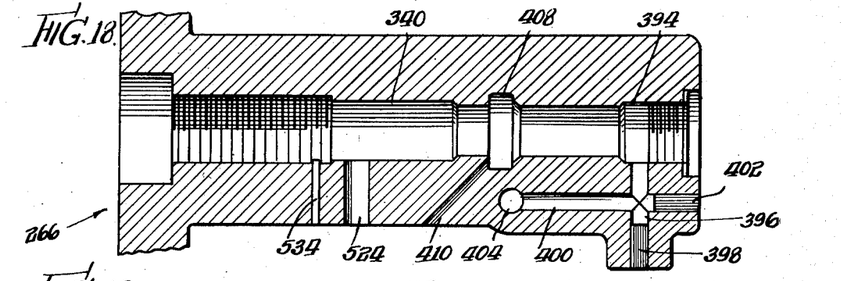
Figure 18 is an enlarged fragmentary view in vertical section taken along the line 18—18 of Figure 14.
Figure 19:
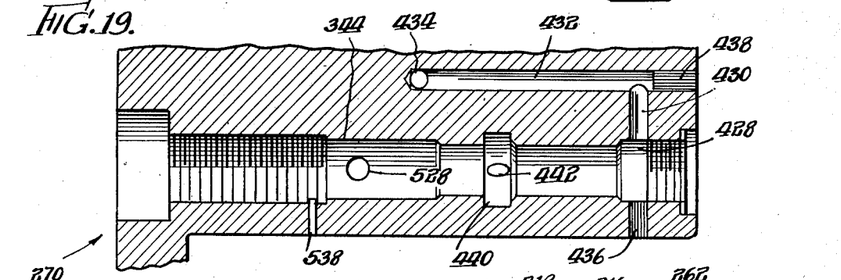
Figures 19 and 20 are enlarged fragmentary views in vertical section taken along the lines 19—19 and 20—20, respectively, of Figure 14.
Figures 20, 21:
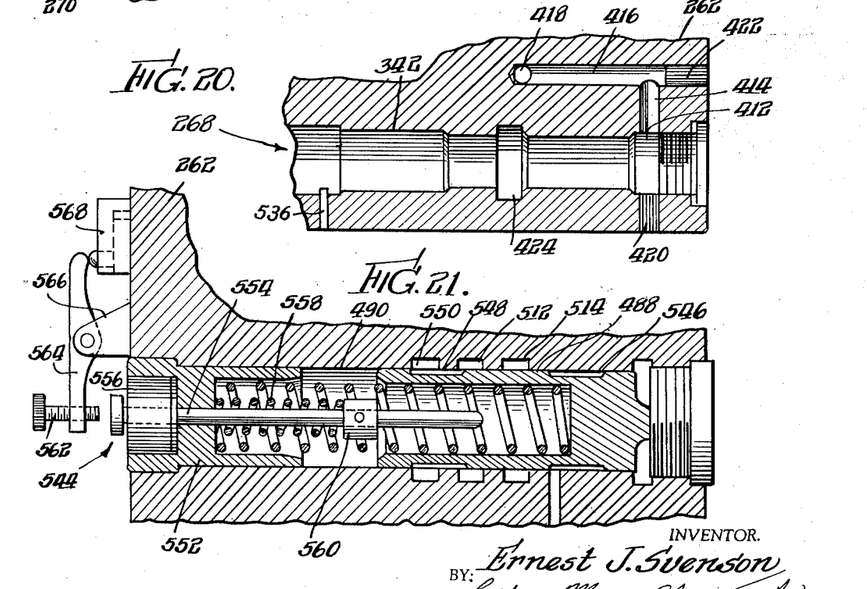
Figure 21 is a sectional view showing a valve modification of the circuit and unit disclosed in Figures 3 to 20.

The pressure control valves 266, 268 and 270 comprise valve plungers 334, 336, and 338 (Fig. 22) slidable in valve bores 340, 342, and 344, respectively, as best shown in Figures 18, 19 and 20. The valve plungers 334, 336 and 338 are provided with flat portions or grooves 346, 348 and 350, respectively (Fig. 22) extending inwardly from their righthand ends along the surfaces of the plungers in an axial direction. These valves also include adjusting rods or stems 352, 354 and 356 having externally threaded portions 358, 360 and 362 received in internally threaded portions 364, 366 and 368 of the valve bores 340, 342 and 344, respectively. Coil springs 370, 372 and 374 are mounted in the valve bores and interposed between the adjusting rods 352, 354 and 356 and the valve plungers 334, 336 and 338, respectively. The settings of the adjusting rods 352, 354, and 356 determine the magnitudes of the forces, exerted by the springs 370, 272, and 374, urging plungers 334, 336, and 338 to the right, thus determining the amount of pressure required to move the plungers to the left (Fig. 22). Leakage around the adjusting rods 352, 354 and 356 is prevented by the seals 376, 378 and 380, respectively, which may be of any suitable construction.

Movements of the plungers to the right are limited by the bore closing plugs 382, 384 and 386, which are provided with reduced axially extending protuberances 388, 390 and 392, respectively, that form abutments engaging the ends of the plungers 334, 336 and 338 when in their extreme position to the right.

The bore 340 of the pressure valve 266 has at one end, as best seen in Figure 18, the inlet port or chamber 394 which is connected by a lateral passage 396, closed at its outer end by the plug 398, to a longitudinal passage 400, closed at its outer end by the plug 402. The passage 400 is connected by a passage 404 (Figs. 14, 15 and 18), which is closed at its outer end by a plug 406, to the chamber 292 of the bore 278 of the main valve 264. The passages 396, 400 and 404 are schematically indicated in Figure 22.

The valve bore 340 also has a discharge port or chamber 408 (Fig. 18), from which the fluid is discharged through an open passage 410 directly into the reservoir.

The valve bore 342 of the pressure valve 268 has an inlet port or chamber 412 (Fig. 20) connected by a lateral passage 414 and a longitudinal passage 416 to a transverse passage 418. The openings which are drilled in the housing 262 to form the passages 414, 416, and 418, are closed by the plugs 420, 422, and 423, respectively. The passage 418 is in communication with a chamber of the bore of the timing valve 274 (Figs. 14 and 22). The valve bore 342 also has a discharge port or chamber 424 from which the fluid is discharged through an open passage 426 (Fig. 14) to the reservoir.

The bore 344 of the pressure valve 270 has an inlet port or chamber 428 (Fig. 19) connected by a lateral passage 430, and a longitudinal passage 432 to a transverse passage 434. The passage 434 connects with a chamber of the bore of the timing valve 274 (Figs. 14 and 22). The openings which are drilled in the housing to form the passages 430 and 432 are closed by the plugs 436 and 438, respectively. The valve bore 344 also has a discharge port or chamber 440 from which the fluid is discharged through an open passage 442 (Figs. 14 and 19) to the reservoir.

The timing valve 272 comprises a valve body or plunger 443 (Fig. 22) slidable in a valve bore 444, and an adjusting rod or stem 446. The valve body 443 is formed to provide a valve head 448 and a hollow skirt 450, the skirt being provided with a circumferential valve groove 452. A coil spring 454, which extends into the hollow skirt 450, is interposed between the head 448 of the valve and a cylindrical block 456 secured in the bore against longitudinal movement, as by a pin 458.

The adjusting rod or stem 446 is provided with a reduced portion 460 which is threaded through a portion of its length as at 462 for reception in the internally threaded part 464 of the block 456. A collar 466 pinned to the reduced rod portion 460 is adapted to engage the inner edge of the block 456 and limit the outward adjustment of the adjusting rod 446. The inward adjustment of the rod 446 is limited by the engagement of the free end of the reduced portion 460 with the valve head 448.

Inward movement of the valve body 443 (movement to the right in Fig. 22) is limited by the engagement of the reduced projecting portion 468 of the valve with the plug 470 that closes one end of the valve bore 444. Leakage of fluid along and around the rod 446 is prevented by the seal 472, which may be of any desired structure.

The valve bore 444 has longitudinally spaced, enlarged portions or annular grooves forming inlet ports or chambers 474 and 476 (Figs. 17 and 22), and an outlet port or chamber 478. The inlet port 474 is connected by the lateral passage 480 to the passage 300 and the port 302 to which the conduit 260 from the plunger pump 116 is connected.

The port or chamber 476 is connected by the intersecting extension 482 (Fig. 22) of the passage 404 and the passages 400 and 396 to the inlet port 394 of the pressure valve 266, and by the passages 404, 294 and 296 to the conduit 194 from the gear or feed pump.

Figure 17:
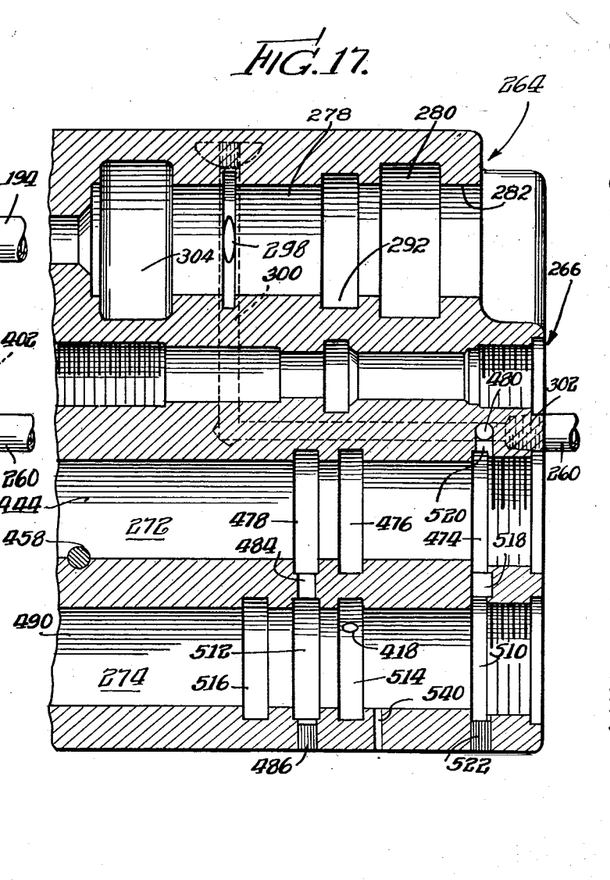
Figure 17 is a fragmentary horizontal section taken along the line 17—17 of Figure 14.

The outlet port 478 is connected by a passage 484, Figs. 17 and 22, to an inlet passage of the timing valve 274. The opening which is drilled in the housing to form the passage 484 is closed by a plug 486.

The timing valve 274 comprises a valve body or plunger 488 mounted in a bore 490. The valve plunger comprises a head 492 and a skirt 494. The head 492 is provided with a reduced central protuberance 496 adapted to engage the plug 498 closing one end of the bore 490 and thereby limit the inward movement of the valve plunger. The head and skirt of the plunger are provided with longitudinally spaced annular grooves forming the valve passages 500 and 502. A plug 504 having a hollow skirt 506 closes the other end of the valve bore 490. A coil spring 508 which extends within the skirt 494 of the valve plunger 488 and the skirt 506 of the plug 504 urges the valve plunger inward to the position shown in Figure 22. The valve bore 490 has longitudinally spaced enlarged portions or annular grooves forming inlet ports or chambers 510 and 512 and outlet ports or chambers 514 and 516.

The inlet port 510 is connected by a lateral passage 518 to the inlet port or chamber 474 of the timing valve 272, Fig. 17. The opening which forms the passage 518 and the passage 520 that connects the port 474 to the passage 480 is closed at its lower end by a plug 522. The port 512 is in communication with the passage 484.

The outlet port or chamber 514 is in communication with the lateral passage 418 from which the fluid is conducted through the passages 416 and 414, Fig. 20, to the inlet port or chamber 412 of the pressure valve 268. The outlet port or chamber 516 is similarly in communication with the passage 434, Fig. 19, from which the fluid is conveyed through the passages 432 and 430 to the inlet port or chamber 428 of the pressure valve 270.

Open passages 524, 526, 528, 530 and 532 (Figs. 14, 16, 18, 19 and 22) extend into the bores of the valves 266, 272, 270, 268 and 274, respectively, and provide breather-drains which prevent the valve plungers from binding and permit any fluid that may leak past the plungers to drain from the chambers behind the plungers into the reservoir. Pins 534, 536 and 538 extend into the threaded portions 364, 366 and 368 of the valve bores 340, 342 and 344 of the valves 266, 268 and 270 respectively, to provide abutments limiting the inward adjustment of the rods 352, 354 and 356 respectively. This limiting of the adjusting movement of these rods prevents the screws from being adjusted far enough to become bound against the inner defining shoulders of the threaded portions 364, 366 and 368, and these abutment means prevent the valve springs from being compressed so far as to cause warping of the springs or locking of the valve against operation.

The valve bore 490 of the valve 274 is in communication, in advance of the discharge port 514, with an open passage 540 through which the fluid from the plunger or metering pump is discharged into the reservoir after the valve plunger 488 has completed its outward movement, i. e., its movement to the left in Fig. 22.

The operation of the fluid control and actuating circuit and associated hone expander unit is as follows: Upon shifting of the master or main control valve 264 to the right in Fig. 22, the portion 312 of the valve body 276 closes the port 282 and establishes communication between the chambers 280 and 292 of the valve bore 278. Fluid is therefore fed from the reservoir 120 (as diagrammatically shown in Fig. 24), through the port 190 into the gear or feed pump 114, from which it is fed through the conduit 194 to the passages 296 and 294 (schematically shown in Fig. 22), and to the chamber 292. From the chamber 292 the fluid passes into the chamber 280, and by way of the passages 284 and 286 to the conduit 290 by which it is conveyed to the port 64 of the fluid pressure hone expanding actuator 60 (as shown in Fig. 24). The piston 66 of this actuator 60 now moves to the right as viewed in Fig. 1 and causes an expansion of the abrasive sticks 72 into contact with the surface to be honed, or performs such other pressure controlled machine operation as may be desired.

At the same time that the chambers 280 and 292 are connected together, the shoulder 318 of the valve body 276 passes to the right of the chamber or groove 298, blocking fluid flow through the passage 300. The fluid is accordingly now forced to the inlet port 474 of the timing valve 272 by the plunger or metering pump 116. The metering pump receives its supply of fluid from the feed pump 114 as previously described, namely from the fluid trapped between the intermeshing teeth of the gears of the feed pump through the pipe 184. The pressure in this pipe 184 is limited by the pressure relief valve 177 which returns the fluid to the reservoir 120 if the pressure in the pipe becomes excessive. The fluid under pressure is delivered as shown in Fig. 24 from the metering pump 116 through the check valve 214 and the pipe 260, and normally through the passage 300 (Fig 22) by which the fluid is conveyed to the port or chamber 298. Communication between the chamber 298 and the radial port 324 of the valve body 276 having been cut off, the fluid is by-passed through the passage 480 to the inlet port 474 of the timing valve 272 and by the passage 518 to the inlet port 510 of the timing valve 274.

The pressure now builds up in the chambers 474 and 510. The plunger 443 is thereby moved outward or to the left in Fig. 24 against the urge of the spring 454. The spring 508 is considerably stiffer than the spring 454, so that the plunger 488 does not move at this time. The rate at which the plunger 443 moves is determined by the rate of delivery of the metering pump 116, which is, in turn, determined by means of the adjusting screw 258 and the slide 246, as previously described. After a slight motion of the plunger 443, the groove 452 establishes a connection between the grooves 476 and 478. Fluid delivered by the feed pump 114 is therefore conveyed from the chamber 292 of the master valve 264 through the passages 404 and 482, the port 476, the groove 452, the port 478, the passage 484, the port 512 of the valve 274, the groove 502, the port 516, and the passages 434, 432, and 430 to the pressure control valve 270. At the fluid pressure for which the valve 270 is set, the plunger 338 (Fig. 22) will be moved outwardly to the left until the flat portion 350 connects the inlet port 428 to the outlet port 440 from which the fluid is returned to the reservoir through the passage 442.

The plunger 443 continues to move until it is stopped by the reduced portion 460 of the adjusting rod 446. The distance the plunger or valve has to move, and hence the time of its motion, is determined by adjustment of the screw 446. The plunger valve 443 stops in its outward position with the ports 476 and 478 still connected by the groove 452. When the plunger valve 443 has been positively stopped by the adjusting screw 446, the pressure in the chamber 510 rises sufficiently to move the plunger valve 488 against the urge of the spring 508. A slight motion of the plunger 488 breaks the connection between the ports 512 and 516. This blocks off the flow of fluid from the feed pump to the pressure control valve 270. The pressure of the fluid in the chamber 292 of the master control valve, and hence the pressure of the fluid in the hone expanding or operating actuator 60 now builds up to a value determined by the setting of the pressure control valve 266. At the set pressure of valve 266, the valve or plunger 334 (Fig. 22) moves outward to connect the intake port 394 to the outlet port 408 by which the fluid is discharged to the reservoir through the passage 410. As schematically indicated in Fig. 24, the fluid passes to the valve 266 from the chamber 292 through the passages 404 and 400. Pressure determined by the valve 266 exists in the chamber 292 until the groove 500 of the plunger 488 connects the inlet port 512 to the outlet port 514. The time required in this phase of the pressure cycle is determined by the rate of delivery of the metering pump 116 and the distance of travel required by the plunger 488 to connect the grooves 512 and 514. Since this distance of travel is constant, the time is determined solely by the adjusted rate of delivery of the metering pump. When port 512 is connected to port 514, fluid communication is established from the chamber 292 through passages 404 and 482, port 476, the groove 452, the port 478, passage 484, port 512, groove 500, port 514, and passages 418, 416 and 414 to inlet port 412 of pressure control valve 268. The pressure in the chamber 292, and hence the pressure of the fluid supplied to the operating actuator 60 is now determined by the setting of this pressure control valve 268. The plunger 336 of the valve 268, at the preset pressure moves outwardly and connects the inlet port 412 to the outlet port 424, by which the fluid is discharged through the passage 426 and back into the reservoir. This pressure will exist until the main control valve 264 is returned to its idle position shown in Fig. 22. When the valve plunger 488 of timing valve 274 has completed its outward movement, the head of the valve will have passed to the left of the passage 540, and therefore the fluid delivered by the metering pump to the inlet port 510 of the valve 274 will be returned to the reservoir through the passage 540. It will, therefore, be seen that the passage 540 prevents the building up of an excessive pressure when the valve plunger has completed its outward movement and abuts the inner edge of the plug 504.

When the master control valve 264 has been operated to return its valve plunger 276 to the idle position, as shown in Fig. 22. the chamber 280 is immediately connected into communication with the reservoir through the port 282, and, simultaneously cut off from the chamber 292. Hence the fluid pressure in the cylinder of the operating or hone expanding actuator 60 suddenly drops to substantially zero, and the springs 80 and 84 quickly act to collapse the abrasive honing sticks and restore the piston 66 to the left as seen in Fig. 1. At the instant that the chamber 280 is open to the reservoir, the port or chamber 298 is also connected to the reservoir through the radial passage 324 and the axial passage 322 of valve plunger 276. Since the pressure in the port 298 therefore suddenly drops to substantially zero, the pressure in the inlet ports 474 and 510 of the timing valves 272 and 274 also drops to zero and the plungers 443 and 488 of these valves snap back to the normal idle position shown in Fig. 22. The plunger or metering pump 116 therefore when the valve 264 is in idle position delivers at substantially no pressure but the gear or feed pump 114 delivers fluid at the pressure set by the adjusting screw 352 of the pressure valve 266, for the fluid from the gear pump is, when the master control valve rests in its idle position, delivered back to the reservoir from the chamber 292 through the passages 404 and 400 to the inlet port 394 of the valve 266, and from this inlet port by the flat part or groove 346 of the valve plunger 334 to the outlet port 408 from which the fluid is discharged through the passage 410 into the reservoir.

The pressure cycle just described in detail will now be summarized. The pressures referred to are at all times indicated by a gauge such as shown at 542 (Fig. 24) connected to the pipe 290.

The rod 326 of the master control valve 264 is pushed inward. The high pressure at which the feed pump 114 has been pumping the fluid through the valve 266 is applied to the hone expanding or operating actuator 60 and this high pressure therefore effects a sudden rapid movement of the rod 69 (Fig. 1) to the right thereby expanding the abrasive honing sticks, or effecting such other operation as may be desired. This high pressure is maintained only for the briefest interval and ceases practically at the very instant that the abrasive sticks engage the work surface. This brief interval in application of the high pressure is determined by the time that it takes for the valve plunger 443 of the timing valve 272 to move to the left (Fig. 24) sufficiently to connect the port 476 to the port 478. As soon as this connection is made, the pressure drops to an intermediate value predetermined by the presetting of the pressure control valve 270. This pressure is desired in the particular embodiment illustrated so that the abrasive sticks are urged against the work surface with a force sufficient to remove the small particles or "fuzz" left projecting from the work surface by the boring tool. The time of application of this pressure is determined by the presetting of the adjusting rod 446 of the timing valve 272, for when the valve plunger 443 has been stopped, the plunger 488 of the valve 274 immediately begins to move and almost immediately breaks the connection to the pressure control valve 270. At the same time that the valve 270 was connected to the feed pump 114, the plunger 334 of the high pressure control valve 266 moved to the right to its idle position shown in Fig. 22 as the pressure in the inlet port 394 dropped.

When the valve 270 is now disconnected from the feed pump, as the valve plunger 488 of the timing valve 274 begins to shift, the pressure again builds up to that determined by the high pressure control valve 266. The pressure by which the abrasive sticks are now expanded against the work surface is therefore high and during the application of this pressure, the major portion of the honing operation is performed in the embodiment set forth. This high pressure is applied for a time determined by the time required for the plunger 488 of the timing valve 274 to complete its fixed travel between the plug 498 and the plug 504.

Finally, the pressure drops to a value determined by the low pressure control valve 268. The abrasive honing sticks are therefore urged against the work with a relatively low pressure engagement so that these sticks perform a final smoothing operation upon the work surface. The pressure remains at this low value until the rod 326 of the master control valve 264 is pulled outward to cause, as previously described, an instantaneous collapsing of the honing sticks.

It will thus be seen that means is provided for effecting the pressure actuation of the honing sticks, or for performing such other operation as may be desired, at a plurality of different pressures, in a predetermined automatic cycle, the various pressure determining devices being individually adjustable and being operative for preselected periods of time, as may be desired.

It should be noted that the time interval determined by the plunger 488 of the timing valve 274 is adjustable only by adjustment of the delivery of the metering pump 116 while the time interval determined by the plunger 443 of the timing valve 272 is effected by adjustment of this pump delivery and also by adjustment of the rod 446. Consequently, the travel time of the plunger 488 should be adjusted first by adjusting the rod 258 (Fig. 4) to adjust the delivery of the pump 116, and then the rod 446 (Fig. 22) should be adjusted to obtain the desired travel for the plunger 443. The adjusting rods 352, 354 and 356 of the pressure control valves 266, 268 and 270 are independently adjustable to obtain the desired tool pressures during the successive time intervals.

In some cases it is desirable to provide means for automatically timing the overall pressure cycle and automatically terminating the pressure operation of the actuated tool. This may readily be accomplished by substituting for the timing valve 274 (Fig. 22) the somewhat modified timing valve 544 (Fig. 21) which effects automotive electric operation of the main valve 264. As shown in this figure the valve plunger 488 has an annular groove 546 corresponding to the valve groove 500 (Fig. 22), but of greater axial length, and an annular groove or valve passage 548 similar to, but of greater axial length than the valve passage 502. The annular groove or outlet port 550 corresponding to the port 516 (Fig. 22) is spaced somewhat further to the left from the port 512. A plug 552 which closes the outer end of the bore 490 is centrally bored to receive a slide rod 554 and is also apertured to receive a seal 556 which prevents leakage of fluid about the rod 554. A coil spring 558, interposed between the plug 552 and a collar 560 pinned to the rod 554 normally urges the rod inward or to the right, but permits its outward movement under the pressure of the fluid when the rod is engaged by the plunger 488. An adjustable screw 562 is adjustably carried by the lower arm of a lever 564 which fulcrums on a bracket 566 secured to the housing 262. The screw is adapted to be engaged and operated by the rod 554 so as to move the lever in a clockwise direction as seen in Figure 21. The lever 564 is adapted to engage and operate a switch 568 that controls the energization of the solenoid 906, Fig. 23, actuating the rod 326 of the master control valve 264 so that the valve will be moved to its idle position upon operation or opening of the switch 568. The longer valve passage 546 permits the ports 512 and 514 to be connected together before the plunger 488 reaches the limit of its outward movement and for a sufficient time to cover the maximum time requirements in the operation of the honing tool at the low pressure determined by the valve 268. The time of application of this low pressure, and hence the time period of the final smoothing operation in the operation of the honing mechanism disclosed, is determined by the adjustment of the screw 562 and the rate of fluid delivery of the metering pump 116. When the desired time has elapsed, the plunger 488 engages the rod 554, shifts this rod outward into engagement with the screw 562, and the lever 564 thereupon operates the switch 568 so that the master control valve is shifted into idle position terminating the pressure cycle and simultaneously terminating the honing or other machine operation.

Referring to the electrical wiring diagram, Fig. 23, it will be seen that the solenoid 906 for controlling the operation of the master control valve 264 is under the control of the switch 568, and also under the control of a manual control switch 902. The arrangement is such that when both switches are closed a circuit is completed to the solenoid 906 operatively connected to the operating rod or stem 326 of the main control valve, the solenoid upon energization causing the valve stem to shift inward or to the right as seen in Fig. 22 to initiate the working cycle. Any suitable means, such as a return spring, may be used to move the rod 326 outward when the solenoid 906 is deenergized. The switch 902 may be manually operated, or it may be automatically operated through a suitable mechanical connection to a reciprocating part of the machine or to the piston rod of the fluid motor 8. In any case, the switch 902 is closed when the machine operation is to be started, such for example as the expanding of the honing tool in the embodiment illustrated, and the switch is opened when the honing or other operation has been completed. When it is desired to time the overall honing or operating cycle, in accordance with the structure of Fig. 21, the normally closed switch 568 may be interposed in the conductor 904. Hence, when the plunger 486 of the timing valve 544 has completed the desired outward movement and opened the switch 568, the solenoid 906 is deenergized and the plunger 326 of the master control valve 264 returned to its idle position. As will be understood, suitable electrical circuits are provided for effecting the energization of the spindle driving motor 42 and the motor 126 of the expander unit.

It is obvious that various changes may be made in the specific embodiments set forth for purposes of illustration without departing from the spirit of the invention. Accordingly the invention is not to be limited to the specific embodiments shown and described, but only as indicated in the following claims.

The invention is hereby claimed as follows:

1. A pressure control system comprising an element responsive to fluid pressure, a fluid control circuit, means interconnecting said element and said circuit whereby to control said element in accordance with pressure conditions within said circuit, a control mechanism including a control valve for applying a plurality of selected fluid pressures to said circuit, and timing means for controlling the cycle of operation of said control mechanism, said timing means comprising said valve, a shiftable fluid operated plunger, and means for variably adjusting the effective stroke of said plunger.

2. A pressure control system comprising an element responsive to fluid pressure, a fluid control circuit, means interconnecting said element and said circuit whereby to control said element in accordance with pressure conditions within said circuit, a control mechanism including a control valve and a plurality of adjustable relief valves for applying a plurality of selected fluid pressures to said circuit, and timing means for controlling the cycle of operation of said control mechanism, said timing means comprising said control valve, a shiftable fluid operated plunger, and means for controlling the speed of shifting of said plunger.

3. A pressure control system comprising an element responsive to fluid pressure, a fluid control circuit, means interconnecting said element and said circuit whereby to control said element in accordance with pressure conditions within said circuit, a control mechanism for applying a plurality of selected fluid pressures to said circuit, and timing means for controlling the cycle of operation of said control mechanism, said timing means comprising a shiftable fluid operated plunger and a variable delivery pump volumetrically adjustable for controlling the speed of shifting of said plunger.

4. In a material working apparatus, a fluid actuator, a fluid supply circuit connected to said actuator, a plurality of pressure control valve means connected into said fluid supply circuit and selectively operable at predetermined different pressures to control the pressure conditions within said actuator, means comprising a plurality of control elements sequentially fluid operated and controlled for effecting the connection of said valves in predetermined sequence to said fluid supply circuit, and fluid control means for controlling the operation of said elements in predetermined sequence.

5. In a material working apparatus, a fluid actuator, a fluid supply circuit associated with said actuator, a plurality of pressure control valve means connected into said fluid supply circuit and selectively operable at predetermined different pressures to control the pressure conditions within said actuator, means comprising a plurality of control elements sequentially fluid operated and controlled for automatically connecting said valves to said fluid supply circuit in predetermined sequence for predetermined time periods, and fluid control means for controlling the operation of said elements in predetermined sequence and at selectively different pressures.

6. In a material working apparatus, a fluid actuator, a fluid circuit for supplying fluid to said actuator, a plurality of individually adjustable pressure determining means associable with said circuit to control the pressure conditions within said actuator, fluid operated means having parts thereof selectively operable at different pressures for rendering the pressure determining devices effective in a preselected sequence, and means for adjustably varying the speed of operation of said fluid operated means.

7. In a material working apparatus, a fluid actuator, a fluid circuit for supplying fluid to said actuator, a plurality of individually adjustable pressure determining devices operably connectible with said circuit to control the pressure conditions within said actuator, automatic means comprising a plurality of fluid actuated control valves sequentially operable for operatively connecting said pressure determining devices to said circuit in preselected sequence for predetermined time periods, and fluid control means for controlling the sequence of operation of said valves.

8. In a material working apparatus, a fluid actuator, a fluid circuit for supplying fluid to said actuator, a plurality of individually adjustable pressure determining devices operably connectible with said circuit to control the pressure conditions within said actuator, and automatic means for operatively connecting said pressure determining devices to said circuit in preselected sequence for predetermined time periods, said automatic means including a plurality of fluid actuated control valves and adjustable means for varying the effective time of operation of said control valves to thereby vary the time periods during which said pressure determining devices are operatively connected to said circuit.

9. In a material working apparatus, a fluid actuator, fluid pressure generating means, fluid circuits including a valve controlling the operative connection of said generating means to said actuator, a plurality of individually adjustable pressure control valves, and fluid operated timing valve means operatively controlled by said first-mentioned valve and operatively controlling the connection of said pressure control valves to said fluid circuits in predetermined sequence for predetermined time periods.

10. A system of fluid control including a fluid actuator, a pump, a fluid supply circuit connecting said pump to said actuator, a plurality of pressure control valves connected into said fluid supply circuit to vary the pressure conditions within said actuator, a second pump, fluid actuated valve means connected to and operated in accordance with the rate of volumetric delivery of said second pump for controlling the connections of said pressure control valves to said fluid supply circuit, and common control mechanism for controlling the direction of fluid from both said pumps.

11. A system of fluid control including a fluid actuator, pumping means, a fluid supply circuit connecting said pumping means to said actuator, pressure control valves connected into said fluid supply circuit and selectively operable at predetermined different pressures to control the pressure conditions within said actuator, and a plurality of fluid actuated valve members, operable at selectively different pressures and connected to said pumping means, for connecting said pressure control valves to said fluid supply circuit in predetermined sequence for predetermined time periods.

12. A system of fluid control including a fluid actuator, pumping means, a fluid supply circuit including a main control valve for connecting said pumping means to said actuator, pressure control valves connectible with said fluid supply circuit and operable at predetermined different pressures to control the pressure conditions within said actuator, fluid actuated timing valve means connected to said pumping means for connecting said pressure control valves to said fluid supply circuit in predetermined sequence for predetermined time periods, means for adjustably controlling said timing valve means to vary the periods of connection of certain of said pressure control valves to said fluid supply circuit, and means controlled by said timing valve means for controlling the operation of said main control valve.

13. A system of fluid control including a fluid actuator, pumping means, a fluid supply circuit connecting said pumping means to said actuator, pressure control valves connected into said fluid supply circuit and selectively operable at predetermined different pressures to control the pressure conditions within said actuator, fluid actuated timing valve means connected to said pumping means for connecting said pressure control valves to said fluid supply circuit in predetermined sequence for predetermined time periods, common control means for controlling the operation of said pressure control valves and said timing valve means, and means for adjustably varying the rate of delivery of fluid through said fluid actuated timing valve means whereby to vary the time periods of connection of said pressure control valves to said fluid supply circuit.

14. A system of fluid control including a fluid actuator, pumping means, a fluid supply circuit connecting said pumping means to said actuator, pressure control valves connected into said fluid supply circuit and operable at predetermined different pressures to control the pressure conditions within said actuator, fluid actuated timing valve means connected to said pumping means for connecting said pressure control valves to said fluid supply circuit in predetermined sequence for predetermined time periods, common control means for controlling the operation of said pressure control valves and said timing valve means, and means for adjustably varying the distance of travel of said timing valve means to vary the time period of connection of at least one of said pressure control valves to said fluid supply circuit.

15. A system of fluid control including a fluid actuator, a pump, a fluid supply circuit connecting said pump to said actuator, pressure control valves connectible with said fluid supply circuit and operable at predetermined different pressures to control the pressure conditions within said actuator, fluid timing valve means, a second pump operatively connected to said first-mentioned pump for receiving fluid therefrom and operatively connected to said timing valve means to cause the operation thereof, and means including fluid connections controlled by said timing valve means for controlling the connection of said fluid supply circuit to said pressure control valves in predetermined timed sequence.

16. A system of fluid control including a fluid actuator, a pump, a fluid supply circuit connecting said pump to said actuator, pressure control valves connectible with said fluid supply circuit and operable at predetermined different pressures to control the pressure conditions within said actuator, fluid timing valve means, a second pump operatively connected to said first-mentioned pump for receiving fluid therefrom and operatively connected to said timing valve means to cause the operation thereof, means including fluid connections controlled by said timing valve means for controlling the connection of said fluid supply circuit to said pressure control valves in predetermined timed sequence, and means for controlling the connection of said second pump to said timing valve means.

17. A system of fluid control including a fluid actuator, a pump, a fluid supply circuit connecting said pump to said actuator, pressure control valves connectible with said fluid supply circuit and operable at predetermined different pressures to control the pressure conditions within said actuator, fluid timing valve means, a second pump operatively connected to said first-mentioned pump for receiving fluid therefrom and operatively connected to said timing valve means to cause the operation thereof, means including fluid connections controlled by said timing valve means for controlling the connection of said fluid supply circuit to said pressure control valves in predetermined timed sequence, and electrically controlled valve means controlling the connection of said timing valve means to said second pump.

18. A system of fluid control including a fluid actuator, a pump, a fluid supply circuit connecting said pump to said actuator, pressure control valves connectible with said fluid supply circuit and operable at predetermined different pressures to control the pressure conditions within said actuator, fluid timing valve means, a second pump operatively connected to said first-mentioned pump for receiving fluid therefrom and operatively connected to said timing valve means to cause the operation thereof, means including fluid connections controlled by said timing valve means for controlling the connection of said fluid supply circuit to said pressure control valves in predetermined timed sequence, and means adjustably controlling said second pump to vary the rate of delivery of fluid by said second pump whereby to adjustably vary the time periods determined by said timing valve means.

19. A pressure control system comprising an element responsive to fluid pressure, a fluid control circuit, means interconnecting said element and said circuit whereby to control said element in accordance with pressure conditions within said circuit, a control mechanism including a control valve for applying a plurality of selected fluid pressures to said circuit, and timing means for controlling the cycle of operation of said control mechanism, said timing means comprising said control valve, a shiftable fluid operated plunger, and means for controlling the speed of shifting of said plunger.

20. A system of fluid control including a fluid actuator, a pump, a fluid supply circuit including a main control valve connecting said pump to said actuator, a plurality of adjustable relief valves connected into said fluid supply circuit to vary the pressure conditions within said actuator, a second pump, means for adjusting the volumetric delivery of said second pump, and timing means comprising a plurality of timing valves connected to and operated in accordance with the rate of volumetric delivery of said second pump for controlling the connections of said relief valves to said fluid supply circuit, the operation of said timing valves being initiated by the operation of said main control valve, and one of said timing valves being operable to initiate the operation of another whereby said timing valves are operable in a predetermined sequence and at a predetermined rate.

ERNEST J. SVENSON.

REFERENCES CITED

The following references are of record in the file of this patent:

UNITED STATES PATENTS

| Number | Name | Date |
| --- | --- | --- |
| 1,838,028 | Ernst et al. | Dec. 22, 1931 |
| 1,943,061 | Douglas | Jan. 9, 1934 |
| 1,978,346 | Ernst et al. | Oct. 23, 1934 |
| 2,167,758 | Johnson et al. | Aug. 1, 1939 |
| 2,244,006 | Harrington | June 3, 1941 |
| 2,265,800 | Connor et al. | Dec. 9, 1941 |
| 2,287,559 | Nye | June 23, 1942 |
| 2,304,131 | Vickers | Dec. 8, 1942 |